United States Patent Office 2,752,365
Patented June 26, 1956

2,752,365
HYDROLYSIS OF OXIDOSTEROIDS

Paul E. Marlatt, Arthur R. Hanze, A Vern McIntosh, Jr., and Robert H. Levin, Kalamazoo, Mich., assignors to The Upjohn Company, Kalamazoo, Mich., a corporation of Michigan No Drawing. Application December 21, 1951,
Serial No. 262,906

24 Claims. (Cl. 260—397.1)

The present invention relates to a novel process for the hydrolysis of certain steroid epoxides, and to the novel products produced by the said hydrolysis procedure.

The novel compounds of the present invention may be represented by the formula:

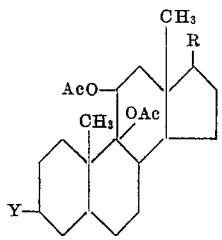

wherein Ac is an acyl group of an organic monocarboxylic acid, especially such acids containing from one to eight carbon atoms, inclusive, wherein Y is selected from the group consisting of carbonyl oxygen and acyloxy groups, especially such groups wherein the acyl group is of a lower-aliphatic acid containing up to and including eight carbon atoms, and wherein R is a side chain containing from one to eight carbon atoms, inclusive, and hydrogen and oxygen only.

It is an object of the present invention to provide a novel group of compounds which are useful in the preparation of steroid compounds containing an oxygen atom at carbon atom eleven. Another object of the invention is the provision of a process for the production of the novel 9,11-diacyloxy compounds. Other objects of the invention will be apparent to those skilled in the art to which this invention pertains.

The compounds of the present invention, as previously stated, are useful in the preparation of steroid compounds having an oxygen atom attached to carbon atom eleven. Such compounds are of particular interest in the field of steroid research due to the biological activity of the cortical hormones and certain known derivatives thereof, which oxygenated steroids are known to have biological effects differing markedly from steroids not oxygenated at carbon atom eleven. The importance of such investigation is moreover emphasized by the acute shortage of adrenal cortical hormones, and the absence of any present suggestion for alleviation of the said shortage except through organic synthesis.

The compounds of the present invention are usually colorless crystalline solids. They are convertible to 9,11-dihydroxy steroids by hydrolysis with an alkali metal hydroxide in an aqueous organic solvent mixture. Clemmensen reduction of the 9,11-diol, followed by chromic acid oxidation, produces the 11-keto steroid.

The 9,11-diacyloxy steroid compounds of the present invention are prepared from selected 3-keto, 3-hydroxy- or 3-acyloxy-9,11-oxido steroids of the formula:

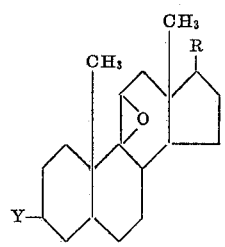

wherein Y is selected from the group consisting of carbonyl oxygen, hydroxy and acyloxy groups, especially such acyloxy groups wherein the acyl group is of a lower aliphatic acid conatining from one to eight carbon atoms, inclusive, and wherein R has the value given previously. The selected 9,11-oxido steroid is reacted with an excess of acetic anhydride in the presence of a catalytic amount of stannic chloride at a temperature between about minus fifty and plus fifty degrees centigrade, preferably between about minus ten and plus ten degrees centigrade. Instead of the acetic anhydride, other lower aliphatic acid anhydrides which are liquid at the said temperature, e. g., propionic, butyric, valeric or hexanoic anhydrides, may be employed, to give, of course, instead of the acetoxy derivative, the acyloxy derivative corresponding to the acid anhydride employed. Alternatively, other lower aliphatic acid anhydrides may be employed, e. g., heptanoic or octanoic anhydride. An inert organic solvent may be used as reaction medium when higher anhydrides which may be solid at the reaction temperatures are employed. If a 3-hydroxy-9,11-oxido steroid is reacted with the anhydride in the presence of stannic chloride, the 3-hydroxy group will be acylated. After a suitable reaction period, e. g., 45 minutes, the reaction product may be poured into ice and water and the mixture stirred until all of the anhydride has hydrolyzed, during which time the product precipitates and may be filtered off. Other reaction times may be employed, the length of time being dependent upon the temperature and the reactants employed.

Examples of starting oxidosteroids for the process of the present invention are methyl 3-alpha-acetoxy-9-alpha,11-alpha-oxidocholanate, methyl 3-alpha-acetoxy-9,11-oxi-doetiocholanate, 9-alpha,11-alpha-oxido-22-isoallospiro-stan-3-beta-ol-3-acetate, 3-beta-acetoxy-9,11-oxidoallopregnane-20-one, methyl 3-keto-3-alpha,11-alpha-oxidocholanate, 9,11-oxidoallopregnane-3,20-dione, 3-hydroxy-9,11-oxidoallopregnane-20-one, and the like.

The starting 3-substituted-9,11-oxidosteroids have the formula given previously, and are prepared by epoxidation of the 9(11)-double bond of a selected 3-substituted $\Delta^{9(11)}$ steroid, of the formula:

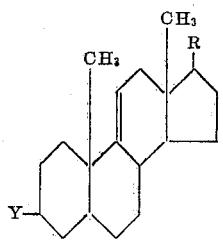

wherein Y is selected from the group consisting of carbonyl oxygen, hydroxy and acyloxy, and wherein R is a side chain containing from one to eight carbon atoms.

inclusive, and hydrogen and oxygen only. In the compounds wherein Y represents an ester of the 3-hydroxy-group with a carboxylic acid containing up to and including eight carbon atoms, acids whose esters can be used are formic, acetic, propionic, butyric, valeric, hexanoic, heptanoic, octanoic, succinic, glutaric, cyclopentanoic, benzoic, toluic, and the like. Preferred acids are the lower-aliphatic monocarboxylic acids. The acids may also contain substituents, such as halo, alkyl, and methoxy, which are non-reactive under the reaction conditions employed. The starting 3-hydroxy compounds are prepared from the 3-acyloxy compounds by saponification.

The following examples are illustrative of the process and products of the present invention, but are not to be construed as limiting.

*Example 1.—Methyl 3,9,11-triacetoxycholanate*

To a one-liter three-neck round-bottom flask equipped with stirrer and thermometer, immersed in an ice-salt bath, were added five grams of methyl-3-beta-acetoxy-9-alpha,11-alpha-oxidocholanate [Hicks, Berg and Wallis, J. Biol. Chem., 162, 645 (1946)] and 300 milliliters of acetic anhydride. After solution was complete and after the inside temperature had dropped to between minus five and plus five degrees centigrade, fifteen drops of anhydrous stannic chloride was added. The reaction was allowed to continue for 45 minutes with stirring and, at the end of this time, the reaction mixture was poured into two liters of ice and water. The mixture was stirred until all of the acetic anhydride had hydrolyzed and the product had crystallized. The product was filtered and dried to give methyl 3,9,11-triacetoxycholanate, identified by infra-red spectrum.

*Analysis.*—Percent calculated for $C_{25}H_{40}O_8$: C, 64.1; H, 8.55; $CH_3CO$, 27.5. Found: C, 63.9; H, 8.50; $CH_3CO$, 27.1.

In a similar manner, using the appropriate lower-alkyl 3-hydroxy or 3-acyloxy-9,11-oxidocholanate and the selected lower-aliphatic monocarboxylic acid anhydride and using an organic solvent non-reactive under the conditions of reaction with those acid anhydrides which are solids under the reaction conditions, other lower-alkyl 3,9,11-triacyloxycholanates are prepared such as, for example, methyl 3-acetoxy-9,11-dipropionyloxycholanate, methyl 3-acetoxy-9,11-dibutyryloxycholanate, methyl 3,9,11-tributyryloxycholanate, methyl 3-propionyloxy-9,11-diacetoxycholanate, methyl 3-octanoyloxy-9,11-diacetoxycholanate, methyl 3,9,11-trivaleryloxycholanate, the corresponding ethyl esters, such as ethyl 3,9,11-triacetoxycholanate, and others.

*Example 2.—Methyl 3,9,11-tripropionyloxycholanate*

In the same manner as given in Example 1, methyl 3,9,11-tripropionyloxycholanate is prepared from methyl 3-beta-hydroxy-9-alpha,11-alpha-oxidocholanate using an excess of propionic anhydride in place of acetic anhydride.

*Example 3.—Methyl 3,9,11-triacetoxyetiocholanate*

To a one-liter three-neck round-bottom flask equipped with a stirrer and thermometer, immersed in an ice-salt bath, were added 400 milliliters of acetic anhydride and seven grams of methyl 3-alpha-acetoxy-9,11-oxido-etiocholanate, which was prepared by epoxidation with perbenzoic acid of methyl 3-alpha-acetoxy-$\Delta^{9(11)}$-etio-cholanate [Lardon and Reichsten, Helv. Chim. Acta, 28, 1420 (1945)]. After solution was complete, and after the inside temperature had dropped to minus seven degrees centigrade, twenty drops of anhydrous stannic chloride was added. The reaction was allowed to continue for one hour with stirring and, at the end of this time, the reaction mixture was poured into 2.5 liters of ice and water. The mixture was stirred until all of the acetic anhydride had hydrolyzed and the product had crystallized. The product was filtered and dried to give methyl 3,9,11-triacetoxyetiocholanate, identified by infra-red spectrum.

In a similar manner, other lower-alkyl 3,9,11-triacyloxyetiocholanates are prepared from the appropriate lower-alkyl 3-acyloxy-9,11-oxidoetiocholanate and the selected lower-aliphatic monocarboxylic acid anhydride using an organic solvent non-reactive under the conditions of reaction with those acid anhydrides which are solids under the reaction conditions. Such compounds include: methyl 3-acetoxy-9,11-dipropionyloxyetiocholanate and other 9,11-diacyloxy homologues such as dibutyryloxy, diheptanoyloxy and dioctanoyloxy, for example; the other 3-acyloxy derivatives of these and like compounds, such as, for example, methyl 3,9,11-tripropionyloxyetiocholanate, methyl 3-butyryloxy-9,11-dihexanoyloxycholanate; the corresponding ethyl etiocholanates, such as, for example, ethyl 3,9,11-triacetoxyetiocholanate and ethyl 3-acetoxy-9,11-dipropionyloxyetiocholanate, octyl-3,9,11- triacetoxyetiocholanate, octyl 3-acetoxy-9,11-dioctyloxyetiocholanate, and others.

*Example 4.—3,9,11-triacetoxyallopregnane-20-one*

In the same manner as given in Example 1, 3,9,11-triacetoxyallopregnane-20-one is prepared from 3-acetoxy-9-alpha,11-alpha-oxidoallopregnane-20-one. The 3-acetoxy-9,11-oxidoallopregnane-20-one is prepared from hecogenin by the following series of reactions: hecogenin (22-isoallospirostan-3-beta-ol-12-one) is dibrominated to give the 11,23 dibromo compound which is converted to 23-bromo-$\Delta^{9(11)}$-22-isoallospirosten - 3 - beta-ol-12-one by treatment with collidine. Removal of the 23-bromine atom by treatment with zinc in acetic acid followed by Wolf-Kishner reduction gives $\Delta^{9(11)}$-22-isospirosten-3-beta-ol(I). Treatment of the latter compound with hot acetic anhydride followed by chromic acid oxidation affords $\Delta^{9(11),16}$-allopregnadien-3-beta-ol-20-one-3-acetate. Selective reduction of the 16,17-double bond with hydrogen in the presence of a palladium catalyst, followed by epoxidation of the 9,11-double bond with perbenzoic acid produces the starting 3-acetoxy-9-alpha, 11-alpha-oxidoallopregnane-20-one.

In a similar manner, other 3-acetoxy-9,11-diacyloxyallopregnane-20-ones are prepared from 3-acetoxy-9,11-oxidoallopregnane-20-one and the selected acid anhydride and using an organic solvent non-reactive under the conditions of reaction with those acid anhydrides which are solids under the reaction conditions. Such compounds include 3-acetoxy-9,11-dipropionyloxyallopregnane-20-one and the higher 9,11-acyloxy homologues, such as, for example, 3-acetoxy-9,11-dihexanoyloxyallopregnane-20-one, and others. Still other 3,9,11-triacyloxyallopregnane-20-ones are prepared by the substitution of the selected acid anhydride for acetic anhydride in the step prior to the chromic oxidation step in Example 4. Such compounds include 3,9,11-tripropionyloxyallopregnane - 20 - one, 3-butyryloxy-9,11-diacetoxyallopregnane-20-one, 3-hexanoyloxy-9,11-dipropionyloxyallopregnane-20-one, 3octanoyloxy-9,11-diacetoxyallopregnane-20-one, 3-octanoyloxy-9,11-dioctanoyloxypregnane - 20 - one, and others.

*Example 5.—Opening of the 9-alpha,11-alpha-oxide ring in 9-alpha-11-alpha-oxido-22-isoallospirostan-3-beta-ol-3-acetate*

Treatment of 9-alpha,11-alpha-oxido-22-isoallospirostan-3- beta-ol-3-acetate [prepared from $\Delta^{9(11)}$-22-isoallospirosten-3-beta-ol (compound I of Example 3) by mild acetylation followed by epoxidation of the 9,11-double bond with perbenzoic acid] with acetic anhydride and anhydrous stannic chloride in the manner given in Example 1 resulted in the opening of the 9,11-oxido ring with the formation of acetoxy groups in positions 9 and 11.

Example 6.—Methyl 3-keto-9,11-diacetoxycholanate

In the same manner as given in Example 1, methyl 3-keto-9-alpha,11-alpha-oxidocholanate [prepared by oxidation of methyl 3-hydroxy-9-alpha,11-alpha-oxidocholanate with N-bromosuccinimide] is converted to methyl 3-keto-9,11-diacetoxycholanate.

Similarly, other methyl 3-keto-9,11-diacyloxycholanates are prepared from methyl 3-keto-9,11-oxidocholanate and the selected acid anhydride using an organic solvent non-reactive under the conditions of reaction with those acid anhydrides which are solids under the reaction conditions. Such compounds include methyl 3-keto-9,11-dipropionyloxycholanate, methyl 3-keto-9,11-dibutyryloxycholanate, methyl 3-keto-9,11-dihexanoyloxycholanate, and others. Still other lower-alkyl 3-keto-9,11-diacyloxycholanates are prepared by the substitution of other lower-alkyl esters for the methyl ester of 3-keto-9,11-oxidocholanate and following the procedure of Example 1 using selected acid anhydrides. Examples of such compounds are ethyl 3-keto-9,11-diacetoxycholanate, ethyl 3-keto-9,11-dipropionyloxycholanate, ethyl 3-keto-9,11-dibutyryloxycholanate, octyl 3-keto-9,11-diacetoxycholanate, octyl 3-keto-9,11-dioctyloxycholanate, and others.

Example 7.—9,11-diacetoxyallopregnane-3,20-dione

In the same manner as given in Example 1, 9,11-diacetoxyallopregnane-3,20-dione is prepared from 9,11-oxidoallopregnane-3,20-dione, which is obtained by saponification of the 3-acetoxy group in 3-acetoxy-9,11-oxidoallopregnane-20-one, followed by oxidation of the three hydroxy group to a three keto group with N-bromosuccinimide.

In the same manner, other 9,11-diacyloxyallopregnane-3,20-diones are prepared from 9,11-oxidoallopregnane-3,20-dione using the selected acid anhydride and using an organic solvent non-reactive under the conditions of reaction with those acid anhydrides which are solids under the reaction conditions. Such compounds include 9,11-dipropionyloxyallopregnane-3,20-dione, 9,11-dibutyryloxyallopregnane-3,20-dione, 9,11-dihexanoyloxyallopregnane-3,20-dione, 9,11-dioctanoyloxyallopregnane-3,20-dione, and others.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 9,11-diacyloxy steroid having the formula:

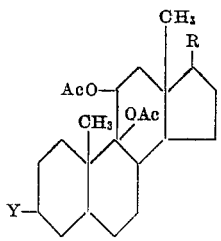

wherein Ac is an acyl group of a hydrocarbon carboxylic acid containing from one to eight carbon atoms, inclusive, wherein Y is selected from the group consisting of carbonyl oxygen and an acyloxy group wherein the acyl group is of a hydrocarbon carboxylic acid containing from one to eight carbon atoms, inclusive, and wherein R is a side chain which contains from one to eight carbon atoms, inclusive, and hydrogen and oxygen only.

2. A lower alkyl ester of 3,9,11-triacyloxycholenic acid, wherein the acyloxy groups have the formula AcO, Ac being the acyl group of a hydrocarbon carboxylic acid containing from one to eight carbon atoms, inclusive.

3. Methyl 3,9,11-triacetoxycholanate.

4. A lower alkyl ester of 3,9,11-triacyloxyetiocholenic acid, wherein the acyloxy groups have the formula AcO, Ac being the acyl group of a hydrocarbon carboxylic acid containing from one to eight carbon atoms, inclusive.

5. Methyl 3,9,11-triacetoxyetiocholanate.

6. 3,9,11-triacyloxyallopregnane-20-one, wherein the acyloxy groups have the formula AcO, Ac being the acyl group of a hydrocarbon carboxylic acid containing from one to eight carbon atoms, inclusive.

7. 3,9,11-triacetoxyallopregnane-20-one.

8. A lower alkyl ester of 3-keto-9,11-diacyloxycholanic acid, wherein the acyloxy groups have the formula AcO, Ac being the acyl group of a hydrocarbon carboxylic acid containing from one to eight carbon atoms, inclusive.

9. Methyl 3-keto-9,11-diacetoxycholanate.

10. 9,11-diacyloxyallopregnane-3,20-dione, wherein the acyloxy groups have the formula AcO, Ac being the acyl group of a hydrocarbon carboxylic acid containing from one to eight carbon atoms, inclusive.

11. 9,11-diacetoxyallopregnane-3,20-dione.

12. A process for the production of a 9,11-diacyloxysteroid which includes: mixing, at a temperature between about minus fifty degrees centigrade and about plus fifty degrees centigrade, a 9,11-oxidosteroid having the formula:

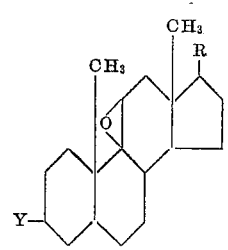

wherein Y is selected from the group consisting of carbonyl oxygen, hydroxy and an acyloxy group wherein the acyl group is of an organic carboxylic acid containing from one to eight carbon atoms, inclusive, and wherein R is a side chain containing from one to eight carbon atoms, inclusive, and hydrogen and oxygen only with an excess of a lower-aliphatic monocarboxylic acid anhydride in the presence of a catalytic amount of stannic chloride to produce a 9,11-diacyloxysteroid.

13. A process for the production of a 9,11-diacyloxysteroid which includes mixing together, at a temperature between about minus fifty degrees centigrade and about plus fifty degrees centigrade, a 9,11-oxidosteroid having the formula:

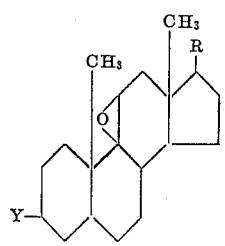

wherein Y is selected from the group consisting of carbonyl oxygen, hydroxy, and an acyloxy group wherein the acyl group is of an organic carboxylic acid containing from one to eight carbon atoms, inclusive, and wherein R is a side chain containing from one to eight carbon atoms, inclusive, and hydrogen and oxygen only with an excess of acetic anhydride in the presence of a catalytic amount of stannic chloride, and separating the 9,11-diacetoxysteroid thus produced.

14. A process for the production of a lower-alkyl 3,9,11-triacyloxycholanate which includes: mixing, at a temperature between about minus fifty degrees centigrade and about plus fifty degrees centigrade, a lower-alkyl 3- acyloxy-9,11-oxidocholanate wherein the acyloxy group has the formula AcO, Ac being of an organic carboxylic acid, containing from one to eight carbon atoms, inclusive, and hydrogen and oxygen only with an excess of a lower-aliphatic monocarboxylic acid anhydride in the presence of a catalytic amount of stannic chloride, and separating the thus-produced lower-alkyl 3,9,11-triacyloxycholanate.

15. A process for the production of methyl 3,9,11-triacetoxycholanate which includes: mixing, at a temperature between about minus ten degrees centigrade and about plus ten degrees centigrade, methyl 3-acetoxy-9,11-oxidocholanate with an excess of acetic anhydride in the presence of a catalytic amount of stannic chloride, and separating the thus-produced 3,9,11-triacetoxycholanate.

16. A process for the production of a lower-alkyl 3,9,11-triacyloxyetiocholanate which includes: mixing, at a temperature between about minus fifty degrees centigrade and about plus fifty degrees centigrade, a lower-alkyl 3-acyloxy-9,11-oxidoetiocholanate wherein the acyloxy group has the formula AcO, Ac being of an organic carboxylic acid containing from one to eight carbon atoms, inclusive, and hydrogen and oxygen only with an excess of a lower-aliphatic monocarboxylic acid anhydride in the presence of a catalytic amount of stannic chloride, and separating the thus-produced lower-alkyl 3,9,11-triacyloxyetiocholanate.

17. A process for the production of methyl 3,9,11-triacetoxyetiocholanate which includes: mixing, at a temperature between about minus ten degrees centigrade and about plus ten degrees centigrade, methyl 3-acetoxy-9,11-oxidoetiocholanate with an excess of acetic anhydride in the presence of a catalytic amount of stannic chloride, and separating the thus-produced methyl 3,9,11-triacetoxyetiocholanate.

18. A process for the production of a 3,9,11-triacyloxyallopregnane-20-one which includes: mixing, at a temperature between about minus fifty degrees centigrade and about plus fifty degrees centigrade, a 3-acyloxy-9,11-oxidoallopregnane-20-one wherein the acyloxy group has the formula AcO, Ac being of an organic carboxylic acid containing from one to eight carbon atoms, inclusive, and hydrogen and oxygen only with an excess of a lower-aliphatic monocarboxylic acid anhydride in the presence of a catalytic amount of stannic chloride, and separating the thus-produced 3,9,11-triacyloxyallopregnane-20-one.

19. A process for the production of 3,9,11-triacetoxyallopregnane-20-one which includes: mixing, at a temperature between about minus ten degrees centigrade and about plus ten degrees centigrade, 3-acetoxy-9,11-oxidoallopregnane-20-one with an excess of acetic anhydride in the presence of a catalytic amount of stannic chloride, and separating the thus-produced 3,9,11-triacetoxyallopregnane-20-one.

20. A process for the production of a lower-alkyl 3-keto-9,11-diacyloxycholanate which includes: mixing, at a temperature between about minus fifty degrees centigrade and about plus fifty degrees centigrade, a lower-alkyl 3-keto-9,11-oxidocholanate with an excess of a lower-aliphatic monocarboxylic acid anhydride in the presence of a catalytic amount of stannic chloride, and separating the thus-produced lower-alkyl 3-keto-9,11-diacyloxycholanate.

21. A process for the production of methyl 3-keto-9,11-diacetoxycholanate which includes: mixing, at a temperature between about minus ten degrees centigrade and about plus ten degrees centigrade, methyl 3-keto-9,11-oxidocholanate with an excess of acetic anhydride in the presence of a catalytic amount of stannic chloride, and separating the thus-produced methyl 3-keto-9,11-diacetoxycholanate.

22. A process for the production of a 9,11-diacyloxyallopregnane-3,20-dione which includes: mixing at a temperature between about minus fifty degrees centigrade and about plus fifty degrees centigrade, 9,11-oxidoallopregnane-3,20-dione with an excess of a lower-aliphatic monocarboxylic acid anhydride in the presence of a catalytic amount of stannic chloride, and separating the thus-produced 9,11-diacyloxyallopregnane-3,20-dione.

23. A process for the production of 9,11-diacetoxyallopregnane-3,20-dione which includes: mixing, at a temperature between about minus ten degrees centigrade and about plus ten degrees centigrade, 9,11-oxidoallopregnane-3,20-dione with an excess of acetic anhydride in the presence of a catalytic amount of stannic chloride, and separating the thus-produced 9,11-diacetoxyallopregnane-3,20-dione.

24. A process for the production of a compound selected from the group consisting of normal and allo-9,11-diacyloxy-20-ketopregnanes which includes: mixing, at a temperature between about minus fifty degrees centigrade and about plus fifty degrees centigrade, a compound selected from the group consisting of normal and allo-9,11-oxido-20-ketopregnanes having the formula:

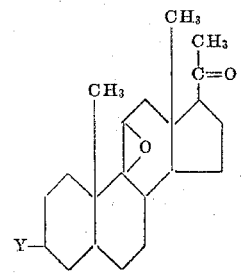

wherein Y is selected from the group consisting of carbonyl oxygen, hydroxy and an acyloxy group wherein the acyl group is of an organic carboxylic acid containing from one to eight carbon atoms, inclusive, with an excess of a lower-aliphatic monocarboxylic acid anhydride in the presence of a catalytic amount of stannic chloride to produce a 9,11-diacyloxy-20-ketopregnane.

References Cited in the file of this patent
Fieser et al.: JACS., 72, 2306–07 (1950).